(12) United States Patent
Woo et al.

(10) Patent No.: US 11,763,703 B2
(45) Date of Patent: Sep. 19, 2023

(54) ELECTRONIC APPARATUS

(71) Applicant: SAMSUNG ELECTRONICS CO., LTD., Suwon-si (KR)

(72) Inventors: Wonmyung Woo, Suwon-si (KR); Jeongil Kang, Suwon-si (KR); Kangmoon Seo, Suwon-si (KR); Sanghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/967,547

(22) Filed: Oct. 17, 2022

(65) Prior Publication Data

US 2023/0135753 A1 May 4, 2023

Related U.S. Application Data

(63) Continuation of application No. PCT/KR2022/013203, filed on Sep. 2, 2022.

(30) Foreign Application Priority Data

Nov. 3, 2021 (KR) .................. 10-2021-0150034

(51) Int. Cl.
| | | |
|---|---|---|
| G06F 3/041 | (2006.01) | |
| G09F 9/30 | (2006.01) | |
| G06F 1/16 | (2006.01) | |

(52) U.S. Cl.
CPC ............ *G09F 9/301* (2013.01); *G06F 1/1652* (2013.01)

(58) Field of Classification Search
CPC ...... G06F 1/1607; G06F 1/1652; G06F 1/166; G09F 9/301
See application file for complete search history.

(56) References Cited

U.S. PATENT DOCUMENTS

| | | |
|---|---|---|
| 7,280,345 B2 | 10/2007 | Park |
| 7,497,707 B2 * | 3/2009 | Wu ..................... H01R 31/06 439/172 |
| 9,710,033 B2 | 7/2017 | Yamazaki et al. |

(Continued)

FOREIGN PATENT DOCUMENTS

| | | |
|---|---|---|
| CN | 209419496 U | 9/2019 |
| KR | 10-1999-0084604 A | 12/1999 |

(Continued)

OTHER PUBLICATIONS

International Search Report (PCT/ISA/210) and Written Opinion (PCT/ISA/237) dated Dec. 22, 2022 issued by the International Searching Authority in International Application No. PCT/KR2022/013203.

*Primary Examiner* — Joe H Cheng
(74) *Attorney, Agent, or Firm* — Sughrue Mion, PLLC

(57) ABSTRACT

An electronic apparatus is provided. The electronic apparatus includes: a main body; and a power supply device configured to be electrically connected to the main body. The power supply device includes: a first housing comprising a first circuit configured to receive alternating current (AC) power; a second housing comprising a second circuit configured to supply direct current (DC) power to the main body; a hinge connected to the first housing and the second housing, and configured to be folded; and a flexible conductive structure electrically connecting the first circuit and the second circuit.

20 Claims, 14 Drawing Sheets

(56) References Cited

U.S. PATENT DOCUMENTS

| | | |
|---|---|---|
| 10,139,879 B2 | 11/2018 | Yamazaki et al. |
| 10,809,784 B2 | 10/2020 | Yamazaki et al. |
| 11,230,397 B2 | 1/2022 | Mondini et al. |
| 11,243,576 B2 | 2/2022 | Gerardi |
| 11,474,646 B2 | 10/2022 | Yamazaki et al. |
| 2011/0018360 A1* | 1/2011 | Baarman ............... H02J 50/90 307/104 |
| 2015/0248149 A1 | 9/2015 | Yamazaki et al. |
| 2017/0228002 A1 | 8/2017 | Yamazaki et al. |
| 2019/0107876 A1 | 4/2019 | Yamazaki et al. |
| 2019/0258300 A1 | 8/2019 | Gerardi |
| 2019/0314932 A1 | 10/2019 | De Chirico |
| 2019/0381566 A1 | 12/2019 | De Chirico |
| 2020/0047304 A1 | 2/2020 | Vianello et al. |
| 2020/0393883 A1 | 12/2020 | Yamazaki et al. |
| 2020/0393884 A1 | 12/2020 | Yamazaki et al. |
| 2021/0072289 A1 | 3/2021 | Peretto et al. |
| 2022/0077695 A1* | 3/2022 | Choi ..................... H02J 7/0048 |
| 2023/0074833 A1* | 3/2023 | Cho ..................... G06F 1/1616 |

FOREIGN PATENT DOCUMENTS

| | | |
|---|---|---|
| KR | 10-2001-0108901 A | 12/2001 |
| KR | 10-0502983 B1 | 7/2005 |
| KR | 10-1253945 B1 | 4/2013 |
| KR | 20-0467441 Y1 | 6/2013 |
| KR | 10-1681755 B1 | 12/2016 |
| KR | 10-2019-0065416 A | 6/2019 |
| KR | 10-2019-0114863 A | 10/2019 |
| KR | 10-2293958 B1 | 8/2021 |

\* cited by examiner

FIG. 14A  FIG. 14B  FIG. 14C
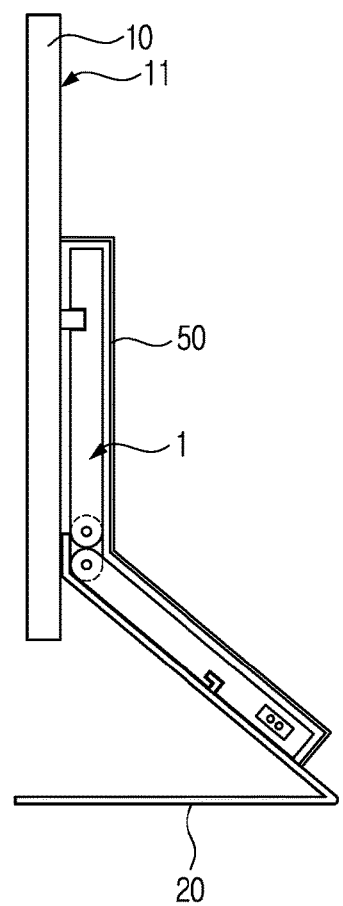
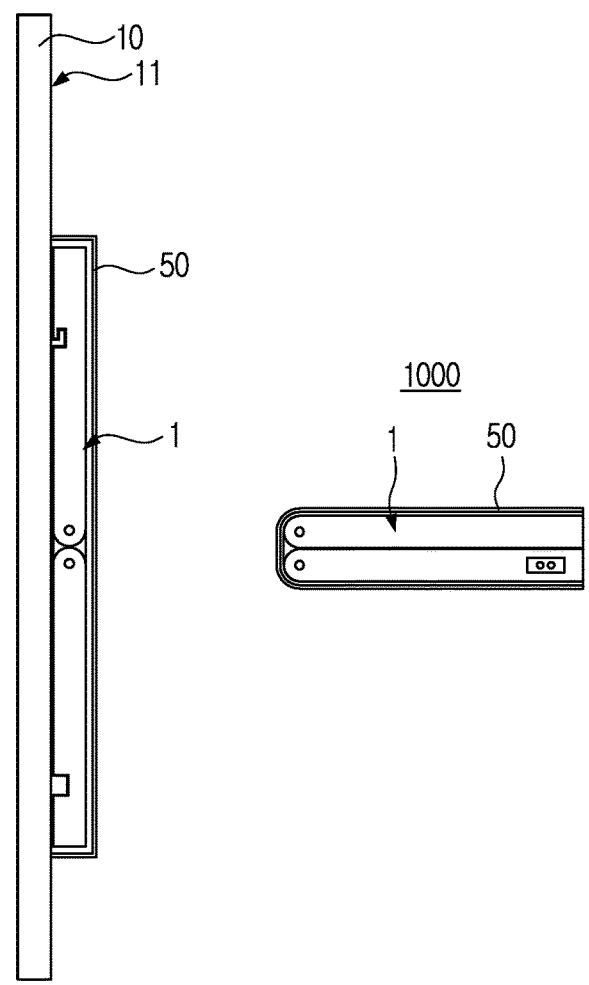

ELECTRONIC APPARATUS

CROSS-REFERENCE TO RELATED APPLICATION(S)

This application is a bypass continuation application of International Application No. PCT/KR2022/013203, filed on Sep. 2, 2022, which is based on and claims the priority to Korean Patent Application No. 10-2021-0150034, filed on Nov. 3, 2021, in the Korean Intellectual Property Office, the disclosures of which are incorporated by reference herein in their entireties.

BACKGROUND

1. Field

The disclosure relates to an electronic apparatus, and more particularly, to an electronic apparatus including a power supply device having two foldable housings.

2. Description of the Related Art

A related art electronic apparatus may have a power supply device inside its main body. Recently, power consumption has increased as electronic apparatuses increase in performance and size, and accordingly, a volume of the power supply device increases, which causes an increase in a thickness of the electronic apparatus in which the power supply is embedded.

In order to provide an electronic apparatus with a reduced thickness, there is a need for a power supply device with a low profile.

SUMMARY

Provided is an electronic apparatus including a power supply device having two foldable housings, which allows for a low profile.

In accordance with an aspect of the disclosure, an electronic apparatus includes: a main body; and a power supply device configured to be electrically connected to the main body. The power supply device includes: a first housing comprising a first circuit configured to receive alternating current (AC) power; a second housing comprising a second circuit configured to supply direct current (DC) power to the main body; a hinge connected to the first housing and the second housing, and configured to be folded; and a flexible conductive structure electrically connecting the first circuit and the second circuit.

The flexible conductive structure may include a metal wire or a flexible circuit board.

The hinge may include: a hinge housing; and a hinge structure provided in the hinge housing.

The flexible conductive structure may extend through the hinge housing.

The hinge structure may include: a first shaft rotatably connecting the first housing and the hinge housing; and a second shaft extending in parallel with the first shaft and rotatably connecting the second housing and the hinge housing.

The power supply device may include: a first substrate having a first surface on which the first circuit is disposed; and a second substrate having a second surface on which the second circuit is disposed, and a third surface which faces the first surface of the first substrate in a state in which the power supply device is in a fully folded configuration.

A first surface of the first housing may face a second surface of the second housing in a state in which the power supply device is in a fully folded configuration. The power supply device may include: a first magnetic member provided on the first surface of the first housing; and a second magnetic member provided on the second surface at a position corresponding to the first magnetic member, and having a polarity opposite to that of the first magnetic member.

The second housing may include a plurality of DC power output ports.

The power supply device may further include a sliding door configured to selectively expose one of the plurality of DC power output ports.

The main body may include a DC power input port, and the second housing may include a DC power output port configured to engage and electrically connect with the DC power input port.

The electronic apparatus may further include a stand configured to support the main body, the first housing may be configured to be mounted to a rear surface of the stand, and the second housing may be configured to be mounted to a rear surface of the main body.

An anchoring protrusion may protrude from the rear surface of the stand, and the first housing may have a groove formed therein which has a shape configured to engage with the anchoring protrusion.

The stand may include: a first supporting structure configured to extend horizontally on a floor; and a second supporting structure connected to the first supporting structure and the rear surface of the main body. An angle between the main body and the second supporting structure may correspond to an angle between the first housing and the second housing.

The electronic apparatus may further include a wall mount configured to fix the main body to a wall, and the first housing and the second housing may be mounted to a rear surface of the main body.

An anchoring protrusion may protrude from the rear surface of the main body, and the first housing may have a groove formed therein which has a shape configured to engage with the anchoring protrusion.

The first circuit may be further configured to generate a first DC voltage based on the AC power, and the second circuit may be further configured to obtain, based on the first DC voltage, a second DC voltage having a voltage level that is different from that of the first DC voltage.

The first circuit may further include an electromagnetic interference (EMI) filter and a power factor correction (PFC) circuit.

The first housing may further include an AC power input port.

The electronic apparatus may further include: a media input port configured to receive encoded media data; and a media output port configured to output decoded media data. One from among the first circuit and the second circuit may be further configured to obtain the decoded media data based on the encoded media data.

In accordance with an aspect of the disclosure, a method of an electronic device including a first housing coupled to a second housing via a hinge is provided. The method includes: receiving AC power via a first circuit provided in the first housing; converting the AC power to DC power; and providing the DC power to a DC output port provided in the second housing.

BRIEF DESCRIPTION OF THE DRAWINGS

The above and other aspects, features and advantages of certain embodiments of the present disclosure will be more apparent from the following description taken in conjunction with the accompanying drawings, in which:

FIGS. 14A, 14B and 14C are views illustrating a structure of a cover member provided on a power supply device.

DETAILED DESCRIPTION

Figure 1:
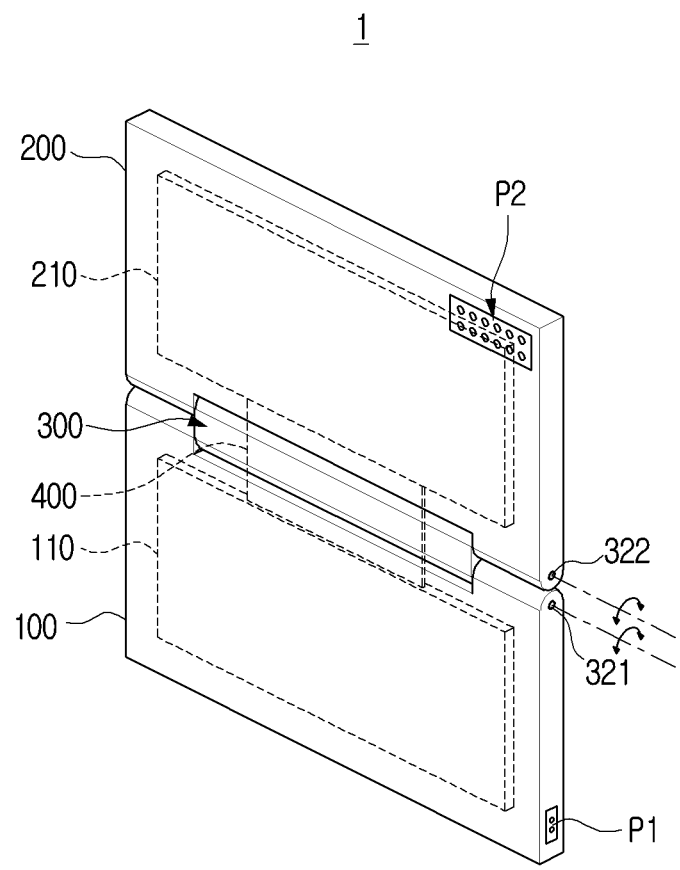
FIG. 1 is a front view of a power supply device according to an embodiment.

Hereinafter, embodiments will be described in detail with reference to the drawings. In the following description, same drawing reference numerals are used for the same elements even in different drawings. In the following description, well-known functions or constructions may not be described in detail if they would obscure the description with unnecessary detail. Further, dimensions of various elements in the accompanying drawings may be arbitrarily selected for assisting in a comprehensive understanding. In addition, the following embodiments may be modified into various other forms, and the scope of the technical spirit of the present disclosure is not limited to the following examples. Rather, these embodiments are provided so that the present disclosure will be more thorough and complete, and will fully convey the scope of the technical spirit of the present disclosure to those skilled in the art.

The terms used in the disclosure and the claims may be general terms selected in consideration of the functions of the various embodiments of the disclosure. However, such terms may vary depending on an intention of those skilled in the art, a legal or technical interpretation, an emergence of a new technology, or the like. Also, there may be some terms arbitrarily selected by an applicant. Such terms may be construed according to meanings defined in the disclosure, and may also be construed based on general contents of the disclosure and a typical technical concept in the art unless the terms are not specifically defined.

In the disclosure, the terms "include", "may include", "comprise" or "may comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the disclosure, components for explaining embodiments of the disclosure are described, but the disclosure is not necessarily limited thereto. Accordingly, some components may be changed or omitted, and the other components may be added. In addition, components may be distributed and arranged in different independent devices.

In the disclosure, the terms "1st" or "first" and "2nd" or "second" may use corresponding components regardless of importance or order and are used to distinguish one component from another without limiting the components.

In the disclosure, expressions such as "at least one from among," when preceding a list of elements, modify the entire list of elements and do not modify the individual elements of the list. For example, the expression, "at least one from among a, b, and c," should be understood as including only a, only b, only c, both a and b, both a and c, both b and c, or all of a, b, and c.

Aspects of embodiments will now be described in greater detail with reference to the accompanying drawings.

Figures 2A, 2B, 2C:
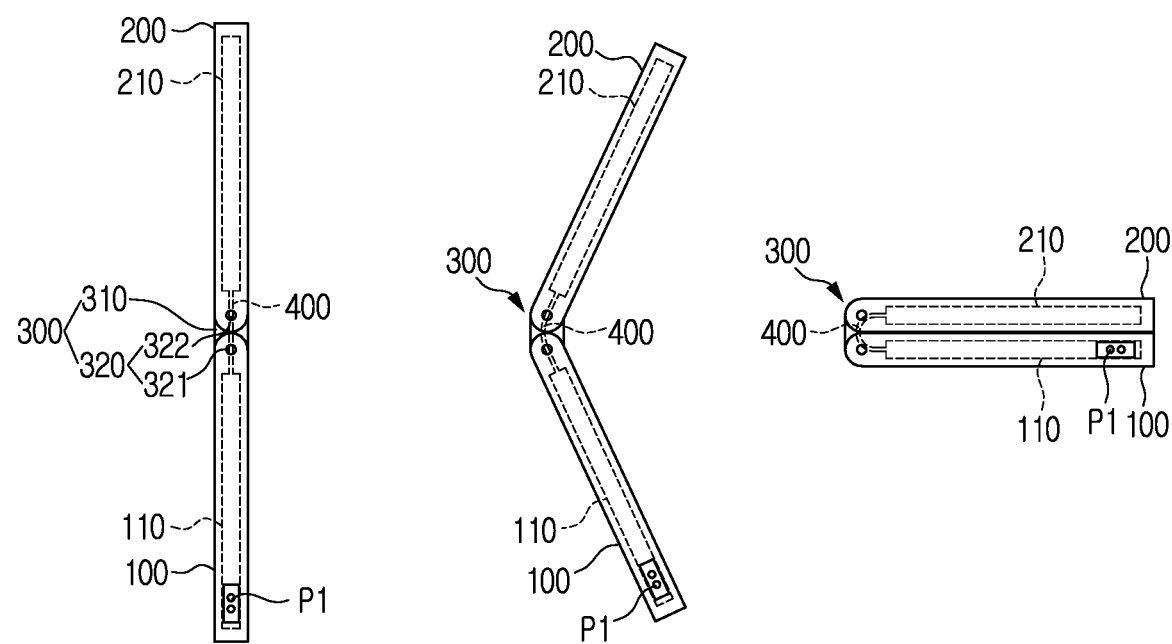
FIGS. 2A, 2B and 2C are side views illustrating a power supply device in an unfolded state, a folded state, and a fully folded state, respectively.

FIG. 1 is a front view of a power supply device according to an embodiment. FIG. 2A is a side view illustrating a power supply device in an unfolded state, FIG. 2B is a side view illustrating a power supply device in a folded state, and FIG. 2C is a side view illustrating a power supply device in a fully folded state.

Referring to FIGS. 1, 2A, 2B and 2C, a power supply device 1 according to an embodiment of the disclosure may include a first housing 100, a second housing 200, a hinge module 300, and a flexible member (flexible conductive structure) 400.

The first housing 100 may accommodate a first circuit 110 which may receive alternating current (AC) power through an AC power input port P1. The AC power input port P1 may be disposed on one side of the first housing 100. The AC power input port P1 may be connected to an external commercial power source (e.g., an outlet) through a wire, and accordingly, AC power may be provided to the first circuit 110 through the AC power input port P1.

The second housing 200 may accommodate a second circuit 210 for supplying direct current (DC) power to an external electronic apparatus through a DC power output port P2. A DC power output port P2 may be electrically connected to an external electronic apparatus, and accordingly, DC power converted from AC power may be provided to the external electronic apparatus through the DC power output port P2.

The first and second housings 100 and 200 may have an approximately rectangular parallelepiped shape and may have the same size as each other, but the shape and size are not limited thereto.

At least one of the first circuit 110 and the second circuit 210 may convert AC power into DC power. For example, the first circuit 110 may convert AC power into DC power, the second circuit 210 may convert AC power into DC power, or the first circuit 110 and the second circuit 210 may convert AC power into DC power together.

A hinge module 300 may connect the first housing 100 and the second housing 200, and may allow for the first housing 100 and the second housing 200 to be rotated relative to the hinge module 300 and relative to each other. For example, the first housing 100 may be connected to the hinge module 300, and the second housing 200 may also be connected to the hinge module 300.

Accordingly, the first and second housings 100 and 200 may be manipulated between a fully unfolded state, a folded state, and a fully folded state.

A flexible member 400 may electrically connect the first circuit 110 and the second circuit 210. The flexible member 400 may include a metal wire or a flexible circuit board (FCB). Accordingly, the flexible member 400 may stably connect the first and second circuits 110 and 210 to each other when the first and second housings 100 and 200 are in the fully unfolded state, the folded state, and the fully folded state.

The hinge module 300 may include a hinge housing 310 and a hinge structure 320. The hinge housing 310 may be disposed between the first housing 100 and the second housing 200. The hinge structure 320 may be accommodated in the hinge housing 310. Accordingly, because the hinge structure 320 is covered by the hinge housing 310, it may not be observed from the outside.

The flexible member 400 may pass through the hinge housing 310. For example, an intermediate section of the flexible member 400 may be accommodated in the hinge housing 310. Accordingly, because the flexible member 400 is covered by the hinge housing 310, it may not be observed from the outside.

The hinge structure 320 may include a first shaft 321 and a second shaft 322. The first shaft 321 may rotatably connect the first housing 100 and the hinge housing 310. The second shaft 322 may rotatably connect the second housing 200 and the hinge housing 310. The second shaft 322 may extend in parallel with the first shaft 321.

The first housing 100 may rotate with respect to the hinge housing 310 along an axis corresponding to the first shaft 321, and the second housing 200 may rotate with respect to the hinge housing 310 along an axis corresponding to the second shaft 322.

The power supply device 1 according to an embodiment of the disclosure may be folded by the first and second housings 100 and 200, and the first and second circuits 110 and 210 may be electrically and stably connected by the flexible member 400 when the first and second housings 100 and 200 are in the fully unfolded state, the folded state, and the fully folded state.

Accordingly, when the first and second housings 100 and 200 are fully unfolded, folded, or fully folded, the power supply device 1 may convert AC power into DC power and provide the DC power to an external electronic apparatus by the first and second circuits 110 and 210, and the flexible member 400.

At least one of the first housing 100 and the second housing 200 may include a media port for receiving a media signal, such as an image signal and/or an audio signal. For example, the first housing 100 may include a media port, the second housing 100 may include a media port, or both the first housing 100 and the second housing 200 may include a media port.

A standard of the image signal received through the media port may be configured in various ways corresponding to an implementation form of the device. For example, the media port may receive an image signal by wire by high definition multimedia interface (HDMI), composite video, component video, super video, Syndicat des Constructeurs d'Appareils Radiortcepteurs et Televiseurs (SCART), USB, or the like.

Also, at least one of the first circuit 110 and the second circuit 210 may decode an image signal. For example, the first circuit 110 may decode the image signal, the second circuit 210 may decode the image signal, or the first circuit 110 and the second circuit 210 may decode the image signal together.

For example, at least one of the first and second circuits 110 and 210 may decode various types of image signals received through the media port into a displayable state and provide the image signals to an external electronic apparatus.

For example, at least one of the first and second circuits 110 and 210 may be an H.264 decoder, but is not limited thereto, and may be implemented as a decoder according to various compression standards, such as a moving picture experts group (MPEG) decoder, a high efficiency video codec (HEVC) decoder, or the like.

Accordingly, the power supply device 1 according to an embodiment of the disclosure may supply both DC power and an external image signal to an external electronic apparatus.

Figure 3:
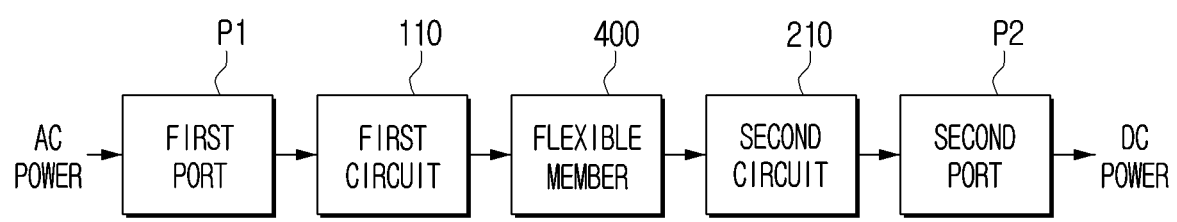
FIGS. 3 and 4 are flowcharts illustrating a process in which a power supply device converts AC power into DC power.
Figure 4:
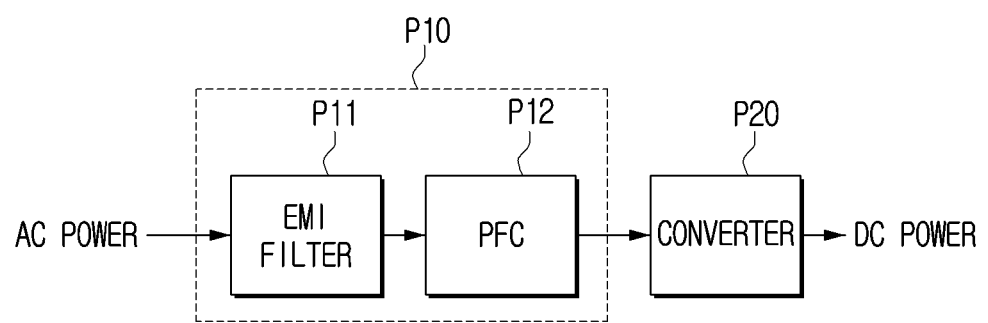

FIGS. 3 and 4 are flowcharts illustrating a process in which a power supply device converts AC power into DC power.

Referring to FIG. 3, the AC power input port P1 may be connected to an external commercial power source (e.g., an outlet) through a wire, and accordingly, AC power may be provided to the first circuit 110 through the AC power input port P1.

At least one of the first circuit 110 and the second circuit 210 may convert AC power into DC power. For example, the first circuit 110 may convert AC power into DC power, the second circuit 210 may convert AC power into DC power, or the first circuit 110 and the second circuit 210 may convert AC power into DC power together.

A flexible member 400 may electrically connect the first circuit 110 and the second circuit 210.

The DC power output port P2 may be electrically connected to an external electronic apparatus, and accordingly, DC power converted from AC power may be provided to the external electronic apparatus through the DC power output port P2.

Referring to FIG. 4, specific roles and functions of the first and second circuits 110 and 210 of the disclosure will be described. Referring to FIG. 4, the power supply device 1 may include a rectifier P10 and a converter P20.

The rectifier P10 of the power supply device 1 may include an electromagnetic interference (EMI) filter P11 and a power factor correction (PFC) circuit P12. The EMI filter P11 may rectify and smooth an input commercial AC power, and output the power as a DC power of a certain voltage. The EMI filter P11 may include a half-wave or full-wave rectification circuit, which may be used for rectification, as well as a capacitor. The capacitor may be connected in parallel to an output terminal of the half-wave or full-wave rectification circuit for smoothing.

The converter P20 of the power supply device 1 may convert the DC power rectified by the rectifier P10 into power having a predetermined voltage. The converter P20 may be of an insulated type, in which a primary side (input) and a secondary side (output) that is insulated from the primary side, form a transformer. The transformer may include primary and secondary windings around a core (magnetic core), and when a change in current occurs in the primary winding, an induced electromotive force may be generated in the secondary winding by a change in magnetic flux passing through the core, resulting in induced current flows.

Figure 5:
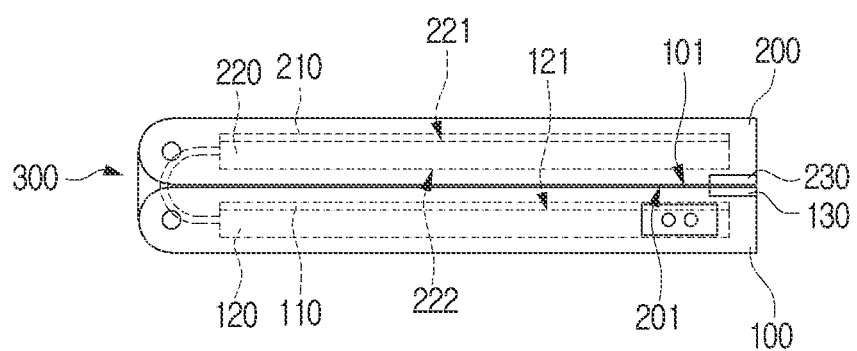
FIG. 5 is a side view illustrating a fully folded state of a power supply device.

FIG. 5 is a side view illustrating a fully folded state of a power supply device. Referring to FIG. 5, the power supply device 1 may further include a first substrate 120 and a second substrate 220.

The first circuit 110 may be disposed on one surface 121 of the first substrate 120. The second circuit 210 may be disposed on one surface 221 of the second substrate 220. The first circuit 110 may be printed on one surface 121 of the first substrate 120, and the second circuit 210 may be printed on one surface 221 of the second substrate 220.

In a state in which the first and second housings 100 and 200 are fully folded, one surface 121 of the first substrate 120 may be disposed to face another surface 222 of the second substrate 220, and the second substrate 220 may be provided between the second circuit 210 and the first circuit 110.

Accordingly, in a state in which the first and second housings 100 and 200 are fully folded, the first circuit 110 and the second circuit 210 may be spaced apart from each other, such that heat generated from the power supply device 1 may be transferred to the outside.

The power supply device 1 may further include a first magnetic member 130 and a second magnetic member 230. The first magnetic member 130 may include one or more first magnets, and the second magnetic member 230 may include one or more second magnets.

In a state in which the first and second housings 100 and 200 are fully folded, one surface 101 of the first housing 100 may be disposed to face the one surface 201 of the second housing 200. The first magnetic member 130 may be disposed on one surface 101 of the first housing 100. The second magnetic member 230 may be disposed at a position corresponding to the first magnetic member 130 on one surface 201 of the second housing 200.

Also, the second magnetic member 230 may have a polarity opposite to that of the first magnetic member 130. For example, in a state in which the first and second housings 100 and 200 are fully folded, the first and second housings 100 and 200 may pull each other by magnetic pulling power of the first and second magnetic members 130 and 230.

Accordingly, a predetermined or more may be applied to the first and second housings 100 and 200 in the fully folded state to unfold the first and second housings 100 and 200, such that the first and second housings 100 and 200 may not be unintentionally unfolded from the fully folded state, and the user may fold or unfold the first and second housings 100 and 200 with smooth feeling when using it.

Figure 6:
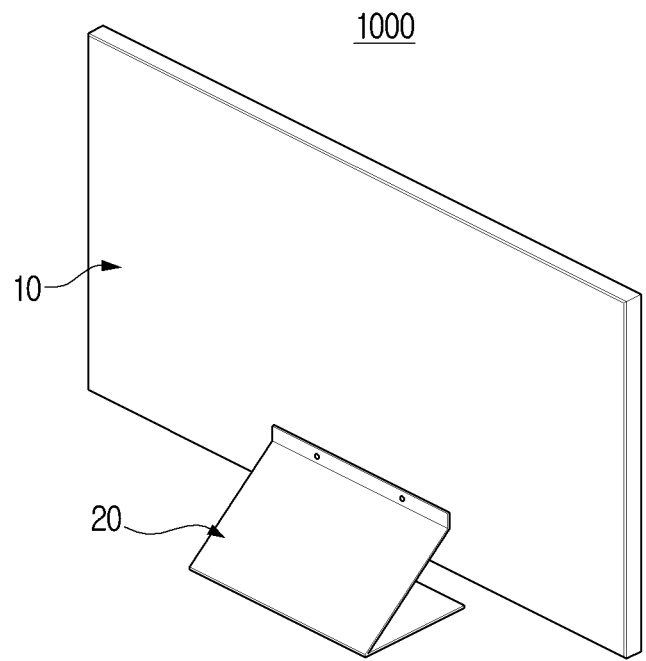
FIGS. 6 and 7 are views illustrating a structure in which a power supply device is mounted on a stand-type electronic apparatus.
Figure 6:
Figure 6:
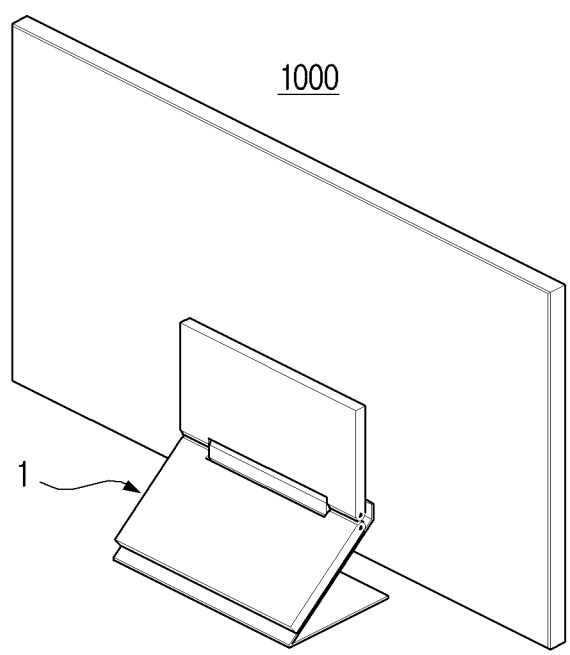
Figure 7:
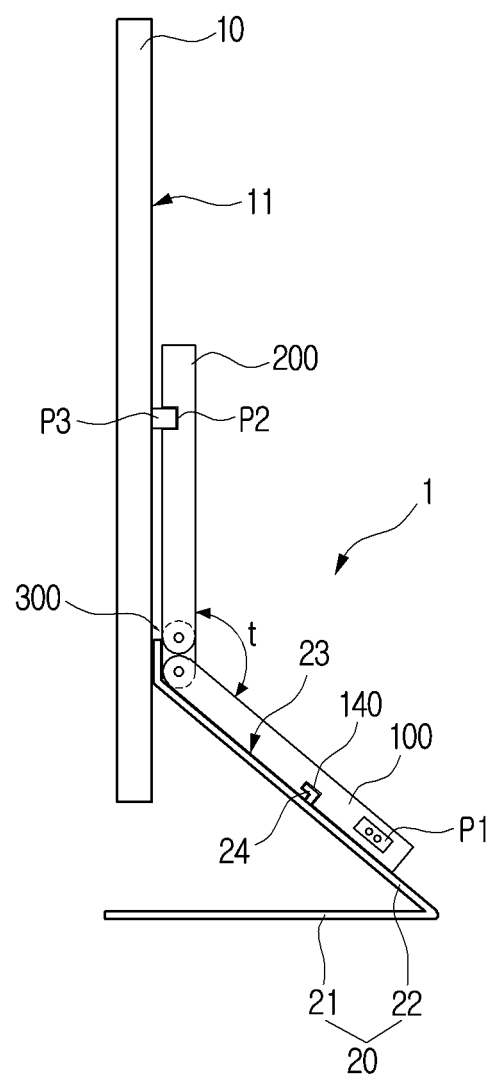

FIGS. 6 and 7 are views illustrating a structure in which a power supply device is mounted on a stand-type electronic apparatus.

Referring to FIGS. 6 and 7, an electronic apparatus 1000 according to an embodiment of the disclosure may include a main body 10 and a power supply device 1.

The electronic apparatus 1000 according to various embodiments of the disclosure may be an electronic apparatus including an image display function, a part of furniture, or a part of a building/structure. For example, the electronic apparatus 1000 may include a television, a digital video disk (DVD) player, a smartphone, a desktop personal computer (PC), a tablet personal computer, a laptop personal computer, personal digital assistant (PDA), portable multimedia player (PMP), mobile medical device, camera, wearable device, TV box (e.g., Samsung HomeSync™, Apple TV™, or Google TV™), a game console, an electronic board, an electronic signature receiving device, a projector, a measuring instrument (e.g. water, electricity, gas, a radio wave measuring device, etc.), or other electronic device.

Also, the electronic apparatus 1000 according to an embodiment of the disclosure may be applied to a reflective screen device that reflects light incident from a projector as well as a screen device that emits light by itself.

A display panel may be disposed on a front side of the main body 10. The display panel may display various contents (e.g., text, image, video, icon and symbol, etc.), which may be viewed by the user. The display panel may include, for example, a liquid crystal display (LCD), a light-emitting diode (LED) display, an organic light-emitting diode (OLED) display, a microelectromechanical systems (MEMS) displays, electronic paper displays, or a flexible display in which a display is bent.

The power supply device 1 may be connected to the main body 10. For example, the power supply device 1 may be electrically connected to the main body 10 to supply DC power to the main body 10.

Accordingly, a AC/DC power conversion circuit may not be built in the main body 10, and instead may be external to the power supply device 1. Thus, the main body 10 of the electronic apparatus 1000 may have a reduced profile, and may therefore be thin with a compact appearance.

The main body 10 may include a DC power input port P3 on a rear surface 11. The DC power input port P3 may connect to the DC power output port P2 in order to electrically connect the DC power input port P3 to the DC power output port P2 of the power supply device 1.

The DC power output port P2 and the DC power input port P3 may have shapes that engage with each other. For example, the DC power output port P2 may have a recessed structure, and the DC power input port P3 may have a protruding structure. For example, the DC power output port P2 may have a protruding structure, and the DC power input port P3 may have a recessed structure.

Accordingly, the DC power output port P2 and the DC power input port P3 may be directly coupled to each other. However, the coupling structure of the DC power output port P2 and the DC power input port P3 is not limited thereto, and the DC power output port P2 and the DC power input port P3 may be spaced apart from each other, and a wire member 40 may electrically connect the DC power output port P2 and the DC power input port P3.

The electronic apparatus 1000 may further include a stand 20 to support the main body 10. For example, the electronic apparatus 1000 illustrated in FIGS. 6 and 7 may be a stand-type electronic apparatus.

The first housing 100 of the power supply device 1 may be mounted on a rear surface 23 of the stand 20. In addition, the second housing 200 of the power supply device 1 may be mounted on a rear surface 11 of the main body 10.

For example, when the electronic apparatus 1000 is viewed from a front, because the power supply device 1 is covered by the main body 10 and the stand 20, the electronic apparatus 1000 may have a compact appearance.

In addition, a width of the first housing 100 may be equal to a width of the stand 20 or smaller than the width of the stand 20. Accordingly, because the first housing 100 is completely covered by the stand 20, the electronic apparatus 1000 may have a more compact appearance.

The stand 20 may include a first anchoring protrusion 24 protruding from the rear surface 23. The first anchoring protrusion 24 may have a hook shape. The first housing 100 may include a fixing groove 140 having a shape which may engage with the first anchoring protrusion 24.

Accordingly, the power supply device 1 may be stably fixed to the stand 20. However, the disclosure is not limited thereto, and a recessed structure may be formed on the rear surface 23 of the stand 20, and a protruding structure may be formed on the first housing 100 to be engaged with each other.

In addition, the stand 20 and the first housing 100 may be mechanically coupled as described above, and may be fixed by magnetic force of a counter-polarity projectiles formed of an iron plate, plastic, or the like.

The stand 20 may include a first supporting member (first supporting structure) 21 disposed horizontally on the floor and a second supporting member (second supporting structure) 22 connecting the first supporting member 21 and the rear surface 11 of the main body 10. The first supporting member 21 may be in contact with a floor, and the second supporting member 22 may extend obliquely upward from a rear end of the first supporting member 21 to a front and may be connected to the rear surface of the main body 10.

An angle between the main body 10 and the second supporting member 22 may be the same as an angle t between the first housing 100 and the second housing 200. For example, the first and second housings 100 and 200 of the power supply device 1 may stably supply DC power to the main body 10 while being folded into shapes corresponding to the main body 10 and the stand 20.

Because the first and second housings 100 and 200 may be folded at various angles, the power supply device 1 according to an embodiment of the disclosure may be applied to a stand-type electronic apparatus 1000 having various shapes.

Figure 8:
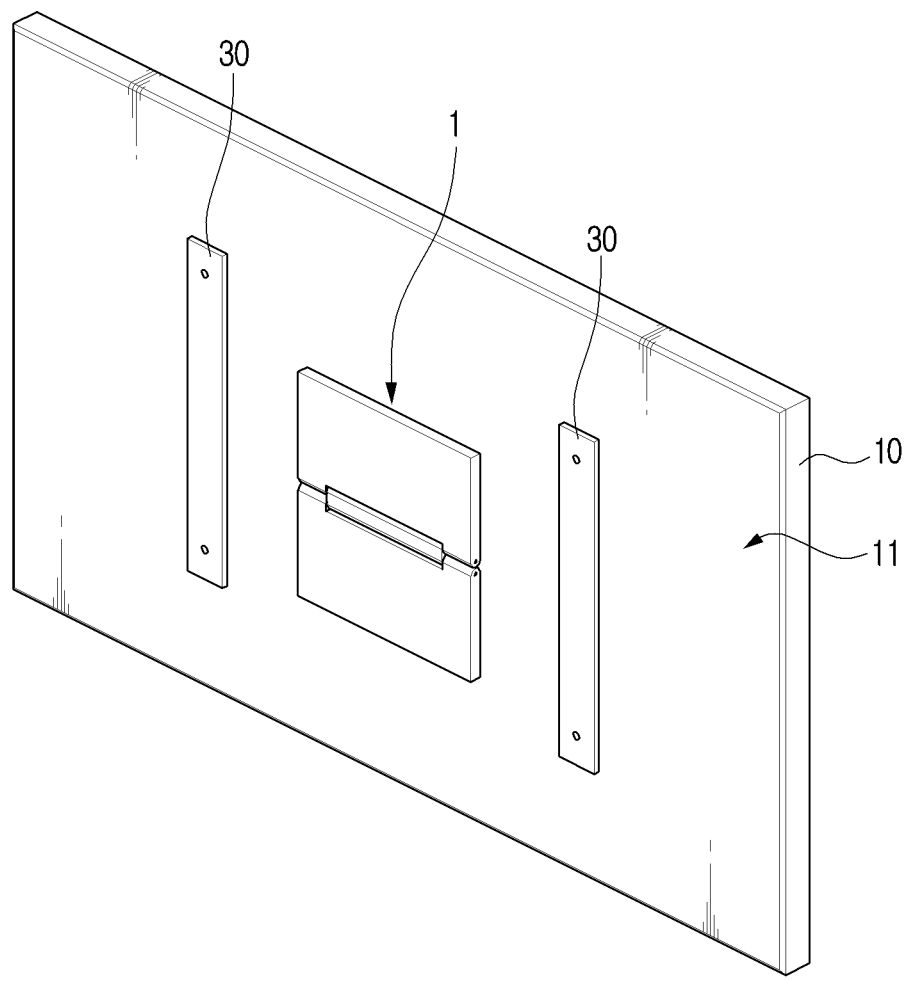
FIGS. 8 and 9 are views illustrating a structure in which a power supply device is mounted on a wall-mounted electronic device.
Figure 9:
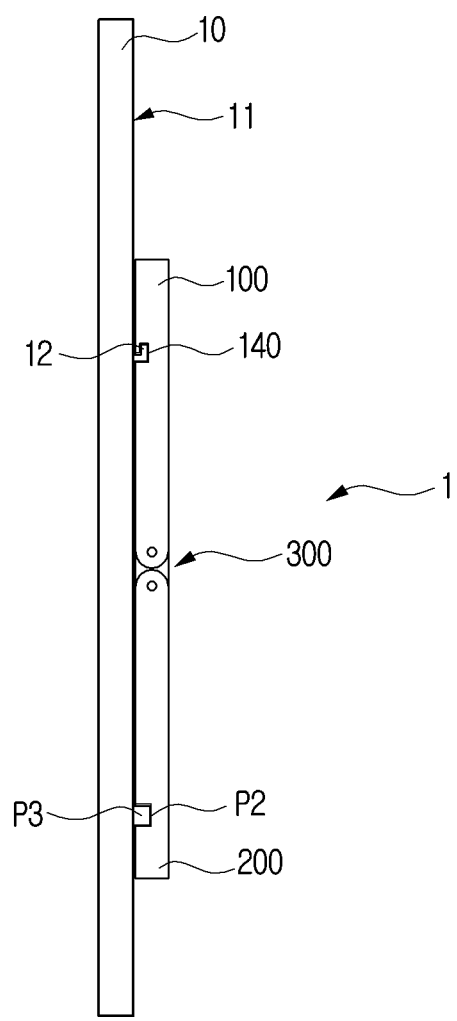

FIGS. 8 and 9 are views illustrating a structure in which a power supply device is mounted on a wall-mounted electronic device.

The electronic apparatus 1000 may further include a wall mount 30 for fixing the main body 10 to a wall. The wall mount 30 may be disposed on the rear surface 11 of the main body 10, and may include a bracket, screws, etc., to fix the main body 10 to the wall.

The first and second housings 100 and 200 may be mounted on the rear surface 11 of the main body 10. For example, the first and second housings 100 and 200 may be in contact with the rear surface 11 of the main body 10 in a fully unfolded state.

The main body 10 may include a second anchoring protrusion 12 protruding from the rear surface 11. The second anchoring protrusion 12 may have a hook shape, but the shape is not limited thereto.

The first housing 100 may include a fixing groove 140 having a shape to engage with the second anchoring protrusion 12. Accordingly, the power supply device 1 may be stably fixed to the main body 10. However, the disclosure is not limited thereto, and a recessed structure may be formed on the rear surface 11 of the main body 10, and a protruding structure may be formed on the second housing 200 which may engage with the recessed structure on the rear surface 11 of the main body 10.

In addition, the main body 10 and the first housing 100 may be mechanically coupled as described above, and may be fixed by magnetic force of a counter-polarity projectiles formed of an iron plate, plastic, or the like.

Figure 10:
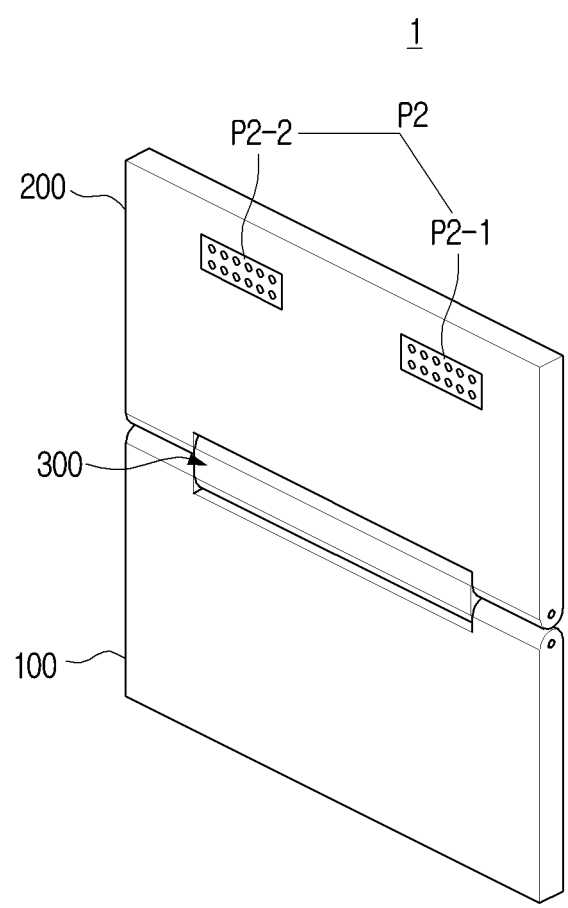
FIGS. 10, 11, and 12 are views illustrating a structure in which a power supply device having a plurality of DC power output ports is mounted on an electronic apparatus.
Figure 11:
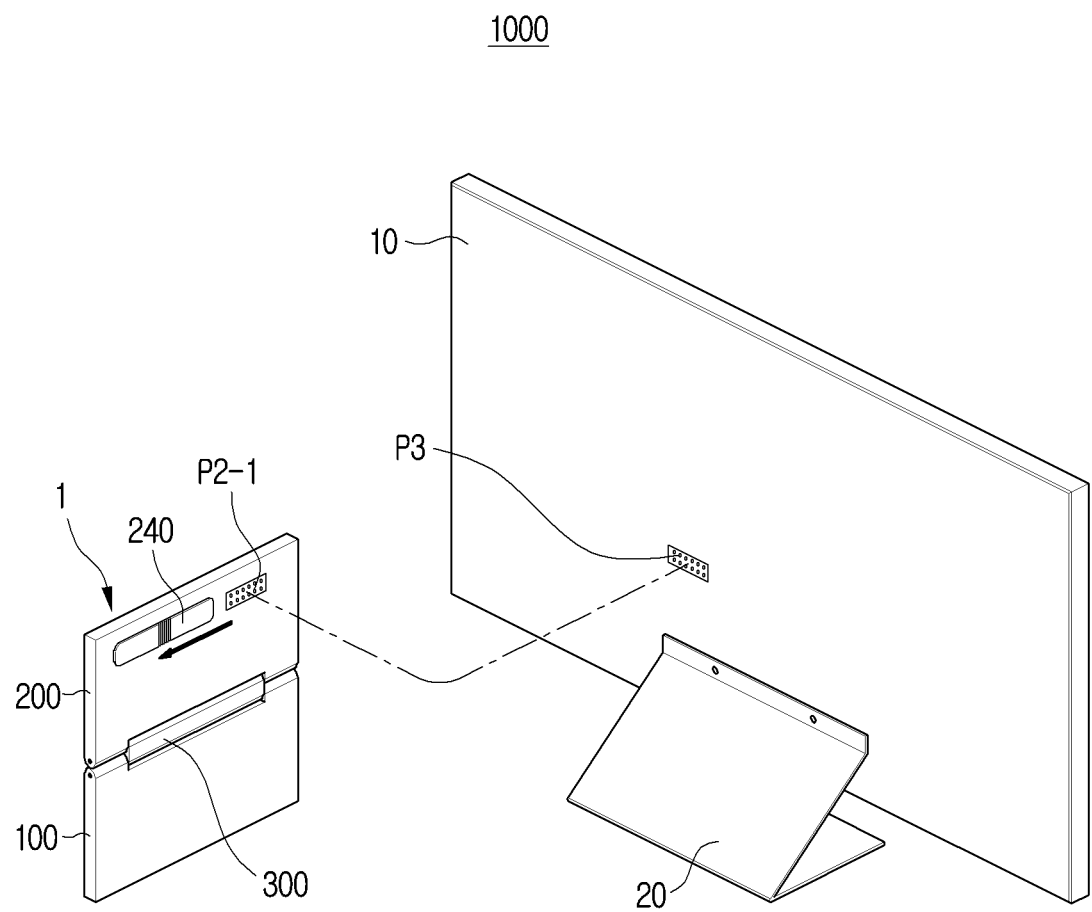
Figure 12:
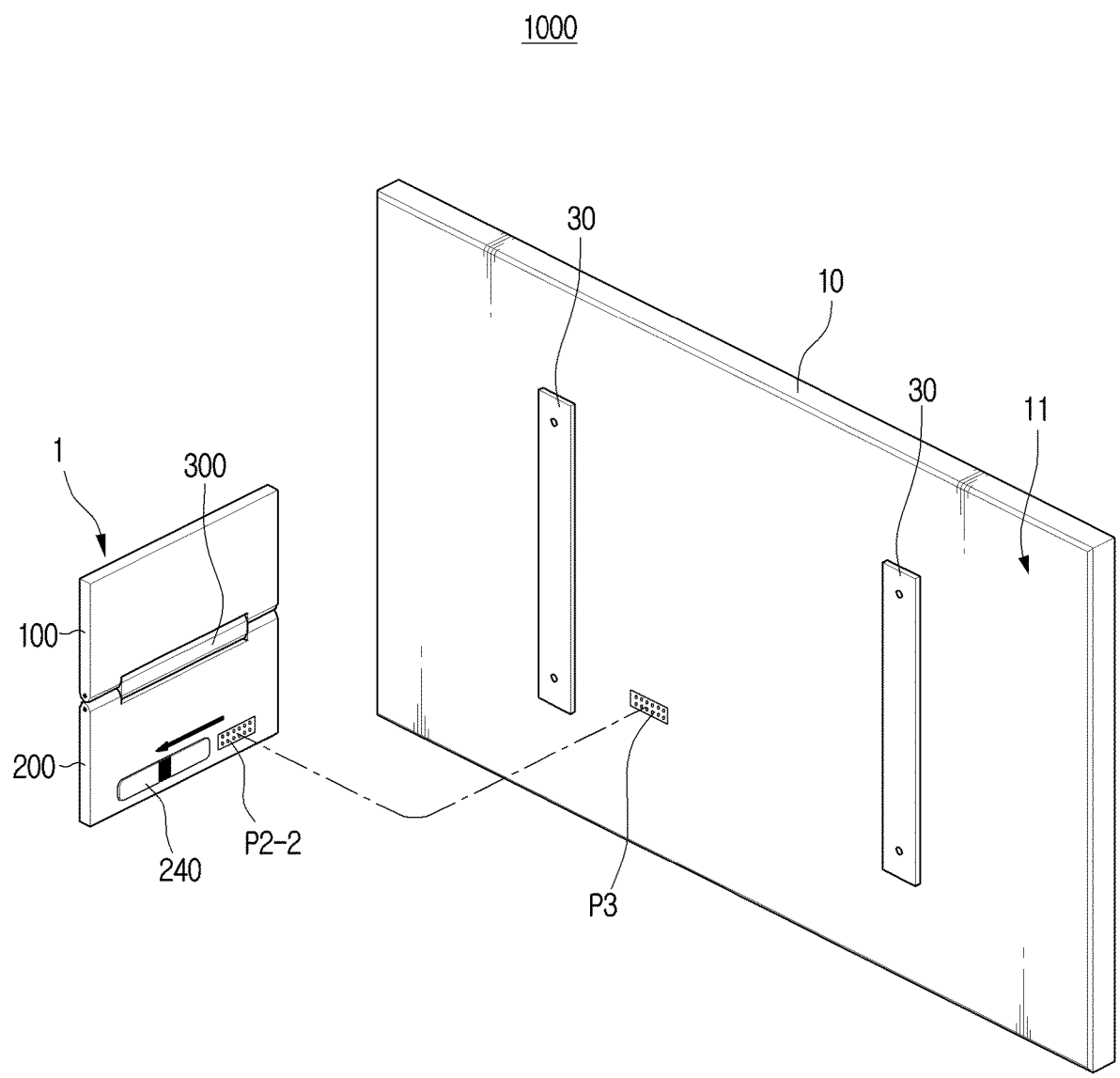

FIGS. 10, 11, and 12 are views illustrating a power supply device having a plurality of DC power output ports is mounted on an electronic apparatus.

The power supply device 1 may include a DC power output port P2 formed in the second housing 200, and the DC power output port P2 may be electrically connected to the electronic apparatus 1000, and thus DC power converted from AC power may be provided to the electronic apparatus 1000 through the DC power output port P2.

Also, the DC power output port P2 may include a plurality of DC power output ports P2-1 and P2-2 disposed on one surface of the second housing 200. Specifically, the DC power output port P2 may include a stand-type DC power output port P2-1 and a wall-mounted DC power output port P2-2.

The stand-type DC power output port P2-1 may be connected to a stand-type electronic apparatus 1000, and the wall-mounted DC power output port P2-2 may be connected to a wall-mounted electronic apparatus 1000. The stand-type DC power output port P2-1 and the wall-mounted DC power output port P2-2 may be disposed on the same surface of the second housing 200.

As the electronic apparatus 1000 is reconfigured from the stand-type of FIG. 11 to the wall-mounted type of FIG. 12, the user may connect the power supply device 1 of FIG. 11 to the electronic apparatus 1000 by rotating the power supply device 1 180 degrees to the power supply device 1 of FIG. 12 so that the power supply device 1 is hidden by the main body, 10 such that it cannot be seen from the front.

Accordingly, because the power supply device 1 cannot be seen from the front regardless of the type of the electronic apparatus 1000, the electronic apparatus 1000 may have a compact appearance.

The electronic apparatus 1000 may further include a door member 240 (i.e., a door) that is slidably disposed on one surface of the second housing 200 and selectively exposes only one of the plurality of DC power output ports P2-1 and P2-2.

When the electronic apparatus 1000 is a stand-type, the door member 240 may cover the wall-mounted DC power output port P2-2 and expose the stand-type DC power output port P2-1. Also, when the electronic apparatus 1000 is of the wall-mounted type, the door member 240 may cover the stand-type DC power output port P2-1 and expose the wall-mounted DC power output port P2-2.

Accordingly, the user may accurately connect, to the electronic apparatus 1000 without confusion, a port corresponding to the type of the electronic apparatus 1000 among the plurality of DC power output ports P2-1 and P2-2.

Figure 13:
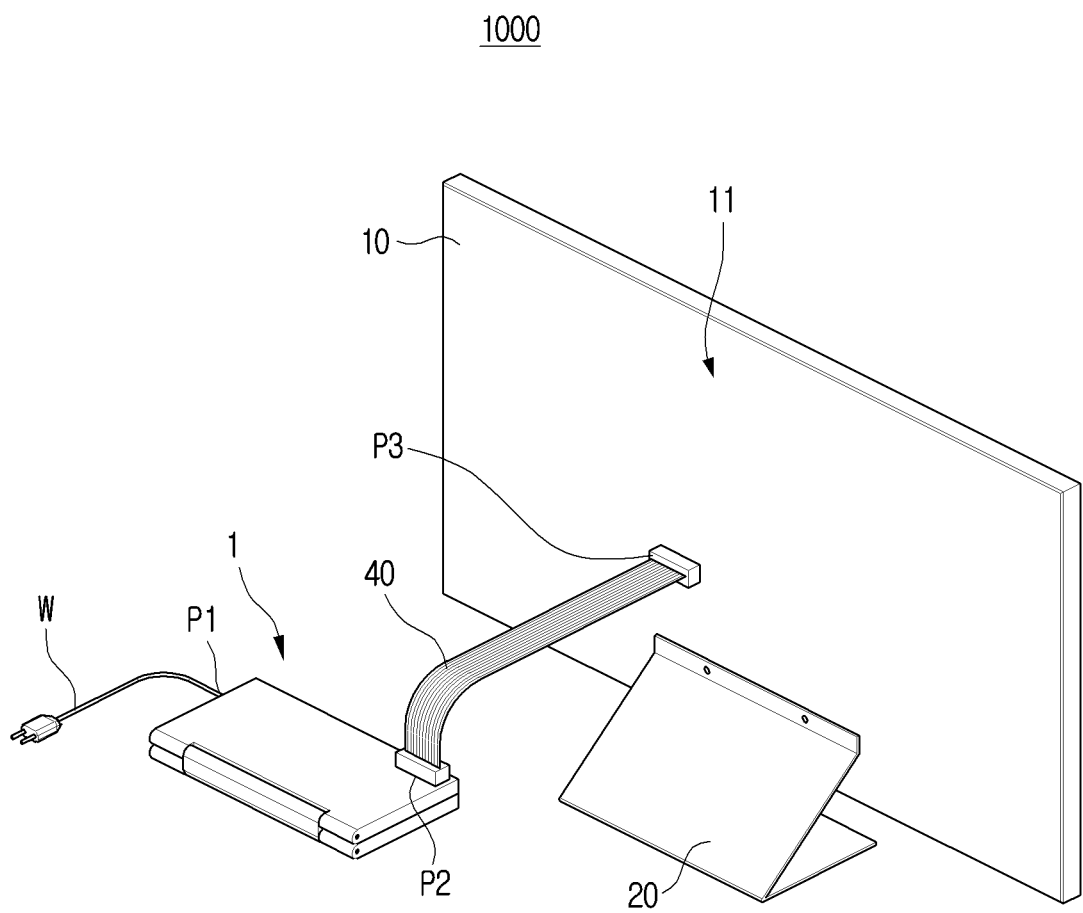
FIG. 13 is a view illustrating a structure in which a power supply device is connected to an electronic apparatus through a wire member.

FIG. 13 is a view illustrating a structure in which a power supply device is connected to an electronic apparatus through a wire member. Referring to FIG. 13, the power supply device 1 may be disposed at a location spaced apart from the main body 10, and may be electrically connected to the DC power input port P3 of the main body 10 through the wire member 40.

For example, the main body 10 may include the DC power input port P3 for receiving DC power on the rear surface 11, and the wire member 40 may electrically connect the DC power output port P2 and the DC power input port P3.

Specifically, the power supply device 1 may receive AC power through an external wire W connected to the AC power input port P1, convert the AC power to DC power, and provide the DC power input port P3 of the main body 10 through the wire member 40 connected to the DC power output port P2.

In this configuration, the power supply device 1 may be in a fully folded state, but is not limited thereto, and may be in a fully unfolded state or a partially folded state.

As the power supply device 1 and the main body 10 are connected through the wire member 40, a protruding structure and a recessed structure may not be formed in the power supply device 1 and the main body 10. The structure may also be applied to the stand-type electronic apparatus 1000 or wall-mounted electronic apparatus 1000 described above.

FIGS. 14A, 14B and 14C are views illustrating a structure of a cover member provided on a power supply device. Referring to FIGS. 14A, 14B and 14C, a cover member 50 may be provided on the power supply device 1. The cover member 50 may be fixed to at least one of the main body 10, the stand 20, and the power supply device 1, but is not limited thereto. In the cover member 50, a hole may be formed at a position corresponding to a port of the power supply device 1, such that the cover member 50 may not interfere with an electrical connection through the AC power input port P1 or the DC power output port P2.

The cover member 50 may cover the power supply device 1 such that the power supply device 1 is not exposed to the outside. The cover member 50 may be formed of plastic, but is not limited thereto. In addition, the cover member 50 may be formed with a picture or pattern on its outer surface. Accordingly, the electronic apparatus 1000 may have an aesthetic appearance by the cover member 50 while the power supply device 1 is not exposed to the outside.

While aspects of embodiments have been particularly shown and described, it will be understood that various changes in form and details may be made therein without departing from the spirit and scope of the following claims.

What is claimed is:

1. An electronic apparatus comprising:
   a main body; and
   a power supply device configured to be electrically connected to the main body,
   wherein the power supply device comprises:
      a first housing comprising a first circuit configured to receive alternating current (AC) power;
      a second housing comprising a second circuit configured to supply direct current (DC) power to the main body;
      a hinge connected to the first housing and the second housing, and configured to be folded; and
      a flexible conductive structure electrically connecting the first circuit and the second circuit.

2. The electronic apparatus of claim 1, wherein the flexible conductive structure comprises a metal wire or a flexible circuit board.

3. The electronic apparatus of claim 1, wherein the hinge comprises:
   a hinge housing; and
   a hinge structure provided in the hinge housing.

4. The electronic apparatus of claim 3, wherein the flexible conductive structure extends through the hinge housing.

5. The electronic apparatus of claim 3, wherein the hinge structure comprises:
   a first shaft rotatably connecting the first housing and the hinge housing; and
   a second shaft extending in parallel with the first shaft and rotatably connecting the second housing and the hinge housing.

6. The electronic apparatus of claim 1, wherein the power supply device comprises:
   a first substrate having a first surface on which the first circuit is disposed; and
   a second substrate having a second surface on which the second circuit is disposed, and a third surface which faces the first surface of the first substrate in a state in which the power supply device is in a fully folded configuration.

7. The electronic apparatus of claim 1, wherein a first surface of the first housing faces a second surface of the second housing in a state in which the power supply device is in a fully folded configuration, and
   wherein the power supply device comprises:
      a first magnetic member provided on the first surface of the first housing; and
      a second magnetic member provided on the second surface at a position corresponding to the first magnetic member, and having a polarity opposite to that of the first magnetic member.

8. The electronic apparatus of claim 1, wherein the second housing comprises a plurality of DC power output ports.

9. The electronic apparatus of claim 8, wherein the power supply device further comprises a sliding door configured to selectively expose one of the plurality of DC power output ports.

10. The electronic apparatus of claim 1, wherein the main body comprises a DC power input port, and
    wherein the second housing comprises a DC power output port configured to engage and electrically connect with the DC power input port.

11. The electronic apparatus of claim 1, further comprising a stand supporting the main body,
    wherein the first housing is mounted to a rear surface of the stand, and
    wherein the second housing is mounted to a rear surface of the main body.

12. The electronic apparatus of claim 11,
    wherein an anchoring protrusion protrudes from the rear surface of the stand, and
    wherein the first housing has a groove formed therein which has a shape configured to engage with the anchoring protrusion.

13. The electronic apparatus of claim 11, wherein the stand comprises:
    a first supporting structure configured to extend horizontally on a floor; and
    a second supporting structure connected to the first supporting structure and the rear surface of the main body, and
    wherein an angle between the main body and the second supporting structure corresponds to an angle between the first housing and the second housing.

14. The electronic apparatus of claim 1, further comprising a wall mount configured to fix the main body to a wall,
    wherein the first housing and the second housing are mounted to a rear surface of the main body.

15. The electronic apparatus of claim 14, wherein an anchoring protrusion protrudes from the rear surface of the main body, and
    wherein the first housing has a groove formed therein which has a shape configured to engage with the anchoring protrusion.

16. The electronic apparatus of claim 1, wherein the first circuit is further configured to generate a first DC voltage based on the AC power, and
    wherein the second circuit is further configured to obtain, based on the first DC voltage, a second DC voltage having a voltage level that is different from that of the first DC voltage.

17. The electronic apparatus of claim 16, wherein the first circuit further comprises an electromagnetic interference (EMI) filter and a power factor correction (PFC) circuit.

18. The electronic apparatus of claim 1, wherein the first housing further comprises an AC power input port.

19. The electronic apparatus of claim 1, further comprising:
    a media input port configured to receive encoded media data; and
    a media output port configured to output decoded media data,
    wherein one from among the first circuit and the second circuit is further configured to obtain the decoded media data based on the encoded media data.

20. A method of an electronic device including a main body and a power supply device configured to be electrically connected to the main body, wherein the power supply device includes: a first housing including a first circuit configured to receive alternating current (AC) power; a second housing including a second circuit configured to supply direct current (DC) power to the main body; a hinge connected to the first housing and the second housing, and configured to be folded; and a flexible conductive structure electrically connecting the first circuit and the second circuit, the method comprising:

receiving the AC power via the first circuit provided in the first housing;

converting the AC power to the DC power; and providing the DC power to a DC output port provided in the second housing.

\* \* \* \* \*